United States Patent
Gudipaty et al.

(10) Patent No.: US 7,653,705 B2
(45) Date of Patent: Jan. 26, 2010

(54) INTERACTIVE RECORDING AND PLAYBACK FOR NETWORK CONFERENCING

(75) Inventors: Ananta Gudipaty, Woodinville, WA (US); Avronil Bhattacharjee, Redmond, WA (US); Zheng Ni, Beijing (CN); Bo Qin, Beijing (CN); Jeremy Smith, Redmond, WA (US); Zhi-Wei Lin, Beijing (CN); Mingju Zhang, Beijing (CN); Sumeet Bawa, Sammamish, WA (US); Aliasgar Haveliwala, Sammamish, WA (US)

(73) Assignee: Microsoft Corp., Redmond, WA (US)

( * ) Notice: Subject to any disclaimer, the term of this patent is extended or adjusted under 35 U.S.C. 154(b) by 436 days.

(21) Appl. No.: 11/609,673

(22) Filed: Dec. 12, 2006

(65) Prior Publication Data
US 2008/0008458 A1    Jan. 10, 2008

Related U.S. Application Data

(60) Provisional application No. 60/805,857, filed on Jun. 26, 2006.

(51) Int. Cl.
G06F 15/16 (2006.01)
G06K 9/36 (2006.01)

(52) U.S. Cl. .................. 709/218; 709/217; 709/204; 382/232

(58) Field of Classification Search ......... 709/204–207, 709/217–219; 725/37–153; 359/725; 382/232
See application file for complete search history.

(56) References Cited

U.S. PATENT DOCUMENTS

| | | | |
|---|---|---|---|
| 5,539,483 A | | 7/1996 | Nalwa |
| 5,717,869 A | * | 2/1998 | Moran et al. ............... 715/716 |
| 5,745,305 A | | 4/1998 | Nalwa |
| 5,793,527 A | | 8/1998 | Nalwa |
| 5,990,934 A | | 11/1999 | Nalwa |
| 6,005,611 A | | 12/1999 | Gullichsen et al. |
| 6,043,837 A | * | 3/2000 | Driscoll et al. ............... 348/36 |
| 6,111,702 A | | 8/2000 | Nalwa |
| 6,115,176 A | | 9/2000 | Nalwa |
| 6,128,143 A | | 10/2000 | Nalwa |
| 6,141,145 A | | 10/2000 | Nalwa |
| 6,144,501 A | | 11/2000 | Nalwa |
| 6,175,454 B1 | | 1/2001 | Hoogland et al. |
| 6,195,204 B1 | | 2/2001 | Nalwa |
| 6,219,089 B1 | | 4/2001 | Driscoll, Jr. et al. |

(Continued)

OTHER PUBLICATIONS (Bajaj, Geetesh; How to Convert PowerPoint Presentations to HTML/Web Pages; Oct. 31, 2004, http://masterview.ikonosnewmedia.com/2004/10/31/how_to_convert_powerpoint_presentations.htm).*

(Continued)

*Primary Examiner*—Joseph E Avellino
*Assistant Examiner*—Afshawn Towfighi
(74) *Attorney, Agent, or Firm*—Lyon & Harr, LLP; Katrina A. Lyon

(57) ABSTRACT

The present interactive recording and playback technique provides the ability to archive the content, the discussions and the metadata of a meeting or similar event; then aggregate, search and annotate across this data; and finally edit, combine, or split various recordings to create new presentations. This interactive recording and playback technique provides rich productivity and innovation that is unavailable today.

18 Claims, 7 Drawing Sheets

U.S. PATENT DOCUMENTS

| | | |
|---|---|---|
| 6,222,683 B1 | 4/2001 | Hoogland et al. |
| 6,285,365 B1 | 9/2001 | Nalwa |
| 6,313,865 B1 | 11/2001 | Driscoll, Jr. et al. |
| 6,331,869 B1 | 12/2001 | Furlan et al. |
| 6,337,708 B1 | 1/2002 | Furlan et al. |
| 6,341,044 B1 | 1/2002 | Driscoll, Jr. et al. |
| 6,346,967 B1 | 2/2002 | Gullichsen et al. |
| 6,356,296 B1 | 3/2002 | Nakatsuka et al. |
| 6,356,397 B1 | 3/2002 | Nalwa |
| 6,369,818 B1 | 4/2002 | Hoffman et al. |
| 6,373,642 B1 | 4/2002 | Wallerstein et al. |
| 6,388,820 B1 | 5/2002 | Wallerstein et al. |
| 6,392,687 B1 | 5/2002 | Driscoll, Jr. et al. |
| 6,424,377 B1 | 7/2002 | Driscoll, Jr. et al. |
| 6,426,774 B1 | 7/2002 | Driscoll, Jr. et al. |
| 6,459,451 B2 | 10/2002 | Driscoll, Jr. et al. |
| 6,466,254 B1 | 10/2002 | Furlan et al. |
| 6,480,229 B1 | 11/2002 | Driscoll, Jr. et al. |
| 6,493,032 B1 | 12/2002 | Wallerstein et al. |
| 6,515,696 B1 | 2/2003 | Driscoll, Jr. et al. |
| 6,539,547 B2 | 3/2003 | Driscoll, Jr. et al. |
| 6,583,815 B1 | 6/2003 | Driscoll, Jr. et al. |
| 6,593,969 B1 | 7/2003 | Driscoll, Jr. et al. |
| 6,597,520 B2 | 7/2003 | Wallerstein et al. |
| 6,700,711 B2 | 3/2004 | Nalwa |
| 6,741,250 B1 | 5/2004 | Furlan et al. |
| 6,756,990 B2 | 6/2004 | Koller |
| 6,885,509 B2 | 4/2005 | Wallerstein et al. |
| 6,924,832 B1 | 8/2005 | Shiffer et al. |
| 2002/0034020 A1 | 3/2002 | Wallerstein et al. |
| 2002/0063802 A1 | 5/2002 | Gullichsen et al. |
| 2002/0094132 A1 | 7/2002 | Hoffman et al. |
| 2002/0154417 A1 | 10/2002 | Wallerstein et al. |
| 2003/0142402 A1 | 7/2003 | Carbo, Jr. et al. |
| 2003/0193606 A1 | 10/2003 | Driscoll, Jr. et al. |
| 2003/0193607 A1 | 10/2003 | Driscoll, Jr. et al. |
| 2004/0008407 A1 | 1/2004 | Wallerstein et al. |
| 2004/0008423 A1* | 1/2004 | Driscoll et al. .............. 359/725 |
| 2004/0021764 A1 | 2/2004 | Driscoll, Jr. et al. |
| 2004/0252384 A1 | 12/2004 | Wallerstein et al. |
| 2004/0254982 A1 | 12/2004 | Hoffman et al. |

OTHER PUBLICATIONS ("Conrad", edit wmv recording downloaded form Livemeeting 2005, Jun. 20, 2005, http://www.eggheadcafe.com/forumarchives/livemeeting/Jun2005/post23319607.asp).*

Circarana photographic unit, last accessed on Sep. 21, 2004 at http://cinerama.topcities.com/circarama.ht.

* cited by examiner

INTERACTIVE RECORDING AND PLAYBACK FOR NETWORK CONFERENCING

This application claims priority under 35 U.S.C. Section 119(e)(1) of provisional application Ser. No. 60/805,857, filed Jun. 26, 2006 and entitled "INTERACTIVE RECORDING AND PLAYBACK FOR NETWORK CONFERENCING".

BACKGROUND

Recording is a core component of many web conferencing systems as it provides an asynchronous access to the content and proceedings of a meeting. High level usage scenarios include:

1. creating training material (prepared presentations) for reuse or broad distribution;
2. preserving material and context for an absent attendee;
3. archiving for offline note-taking or preserving discussions; and
4. archiving content for compliance with various rules and laws.

The fundamental principle currently driving the investment in recordings is the notion that the meeting content and discussions have value far beyond the meeting.

The components of a typical recording system are generally the same and include a capture process that captures meeting proceedings. It also includes a publishing process that converts the captured data into a format that can be rendered readily by a playback application. The playback application renders the published data and ideally imposes minimum system requirements to achieve greatest reach. Besides the capture process, the publishing process and the playback process, a typical recording system also includes a content management system to access and manage recordings. Finally, some recording systems include an editor that enables post processing for error correction of the content or overall fit and finish.

Many previous meeting recording systems suffer from various drawbacks. They are often difficult to set up and use, requiring much manual effort to effectively capture and playback meeting data. The recordings additionally do not lend themselves to readily being searched and they cannot be split out to play back only certain tracks of data. Additionally, proprietary software is often needed to playback the recorded data which makes broad distribution and play back of the recorded data difficult.

SUMMARY

The present interactive recording and playback technique provides the ability to archive the content, the discussions and the metadata of a meeting or similar event; then aggregate, search and annotate across this data; and finally even edit, combine, or split various recordings to create new presentations. The present interactive recording and playback technique simultaneously records multiple tracks in multiple formats from multiple sources of a multi-media event and each track is independent from the other tracks and operates in parallel. The present interactive recording and playback technique reformats the recorded data into a universal format for playback. This universal format is ubiquitous in that it is platform neutral (e.g., independent of the computer or operating system used). The data in the universal format is accessible using only a web browser and a media player when it is played back.

It is noted that while the foregoing limitations in existing recording and playback schemes described in the Background section can be resolved by a particular implementation of an interactive recording and playback technique, this is in no way limited to implementations that just solve any or all of the noted disadvantages. Rather, the present technique has a much wider application as will become evident from the descriptions to follow.

In the following description of embodiments of the present disclosure reference is made to the accompanying drawings which form a part hereof, and in which are shown, by way of illustration, specific embodiments in which the technique may be practiced. It is understood that other embodiments may be utilized and structural changes may be made without departing from the scope of the present disclosure.

DESCRIPTION OF THE DRAWINGS

The specific features, aspects, and advantages of the disclosure will become better understood with regard to the following description, appended claims, and accompanying drawings where:

DETAILED DESCRIPTION

1.0 The Computing Environment

Before providing a description of embodiments of the present interactive recording and playback technique, a brief, general description of a suitable computing environment in which portions thereof may be implemented will be described. The present interactive recording and playback technique is operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1:
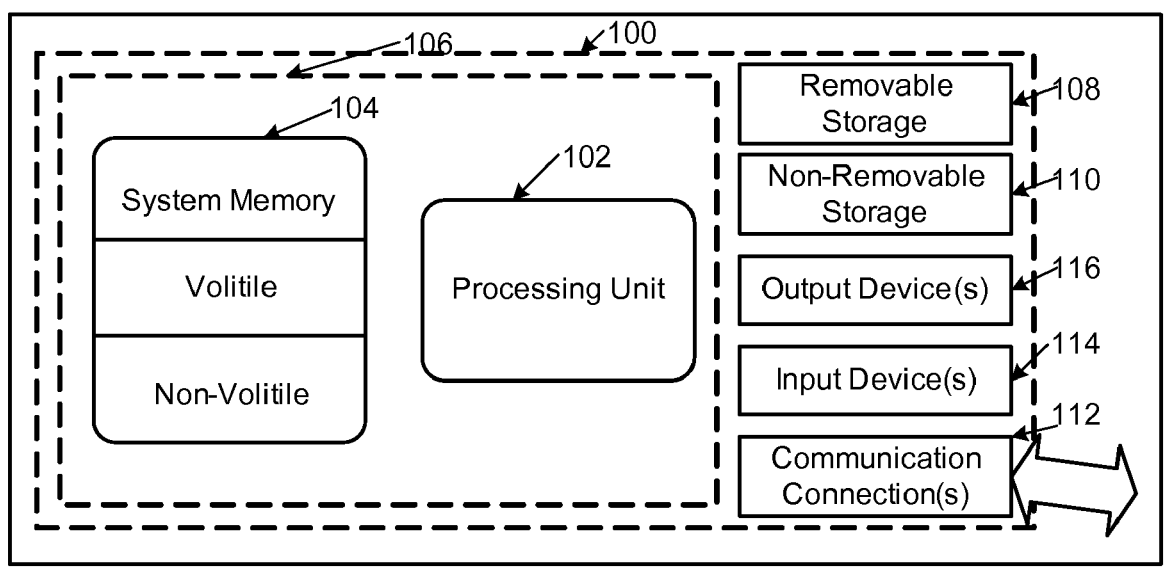
FIG. 1 is a diagram depicting a general purpose computing device constituting an exemplary system for a implementing a component of the present interactive recording and playback technique.

FIG. 1 illustrates an example of a suitable computing system environment. The computing system environment is only one example of a suitable computing environment and is not intended to suggest any limitation as to the scope of use or functionality of the present interactive recording and playback technique. Neither should the computing environment be interpreted as having any dependency or requirement relating to any one or combination of components illustrated in the exemplary operating environment. With reference to FIG. 1, an exemplary system for implementing the present interactive recording and playback technique includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, microphone, mouse, pen, voice input device, touch input device, and so on. Output device(s) 116 such as a display, speakers, a printer, and so on may also be included. All these devices are well know in the art and need not be discussed at length here.

Device 100 can include a camera as an input device 114 (such as a digital/electronic still or video camera, or film/photographic scanner), which is capable of capturing a sequence of images, as an input device. Further, multiple cameras could be included as input devices. The images from the one or more cameras are input into the device 100 via an appropriate interface (not shown). However, it is noted that image data can also be input into the device 100 from any computer-readable media as well, without requiring the use of a camera.

The present interactive recording and playback technique may be described in the general context of computer-executable instructions, such as program modules, being executed by a computing device. Generally, program modules include routines, programs, objects, components, data structures, etc. that perform particular tasks or implement particular abstract data types. The present interactive recording and playback technique may also be practiced in distributed computing environments where tasks are performed by remote processing devices that are linked through a communications network. In a distributed computing environment, program modules may be located in both local and remote computer storage media including memory storage devices.

The exemplary operating environment having now been discussed, the remaining parts of this description section will be devoted to a description of the program modules embodying the present interactive recording and playback technique.

2.0 Interactive Recording and Playback Technique

The present interactive recording and playback technique is a part of a live web-based conferencing application that provides full collaboration capabilities. That is, it brings to a conference integrated data, audio and video which can recorded and re-used for various other applications. Rich recordings, recordings that preserve the native content of data as much as possible at the highest fidelity possible, are captured and are renderable using native browser-supported formats. A meeting with multiple tracks can be recorded and repurposed for asynchronous playback. The rich recordings captured are fully editable and are indexed with multiple indexes for seek, fast forward playback and speaker detection. The original applications used to create the meeting content are not necessary to edit the recorded content to create new presentation materials.

Recordings may be defined by a spectrum ranging from as-is recordings to fully scripted recordings. In as-is recordings, data is preserved as is with no editing or broad distribution. This type of recording is typically used for preserving important conversations, offline note-taking or for legal compliance in corporate environments. This data is hardly distributed, if at all and has low subsequent usage. Fully scripted recordings, on the other hand, may use the recording process only as a first step or a baseline starting point. The data is then edited (sometimes iteratively) to create a fully polished presentation or training material that is broadly distributed. Everything else in web conferencing recording, such as the typical missed meeting scenario, falls in between.

The more feature rich the set of components of a recording system are, the more likely the recording system is to fill the needs of the spectrum end-to-end. The present interactive recording and playback technique is very feature rich and support the whole spectrum of recording and playback capabilities discussed above. It employs a timeline based data editing model which enables users to combine audio narration, speaker video, electronic presentation slides (e.g. Microsoft Corporation's PowerPoint® slides), text/HTML material, and multimedia content into a rich high-fidelity presentation that can be played back using a browser, preferably with an embedded media player.

2.2 Architecture.

Figure 2:
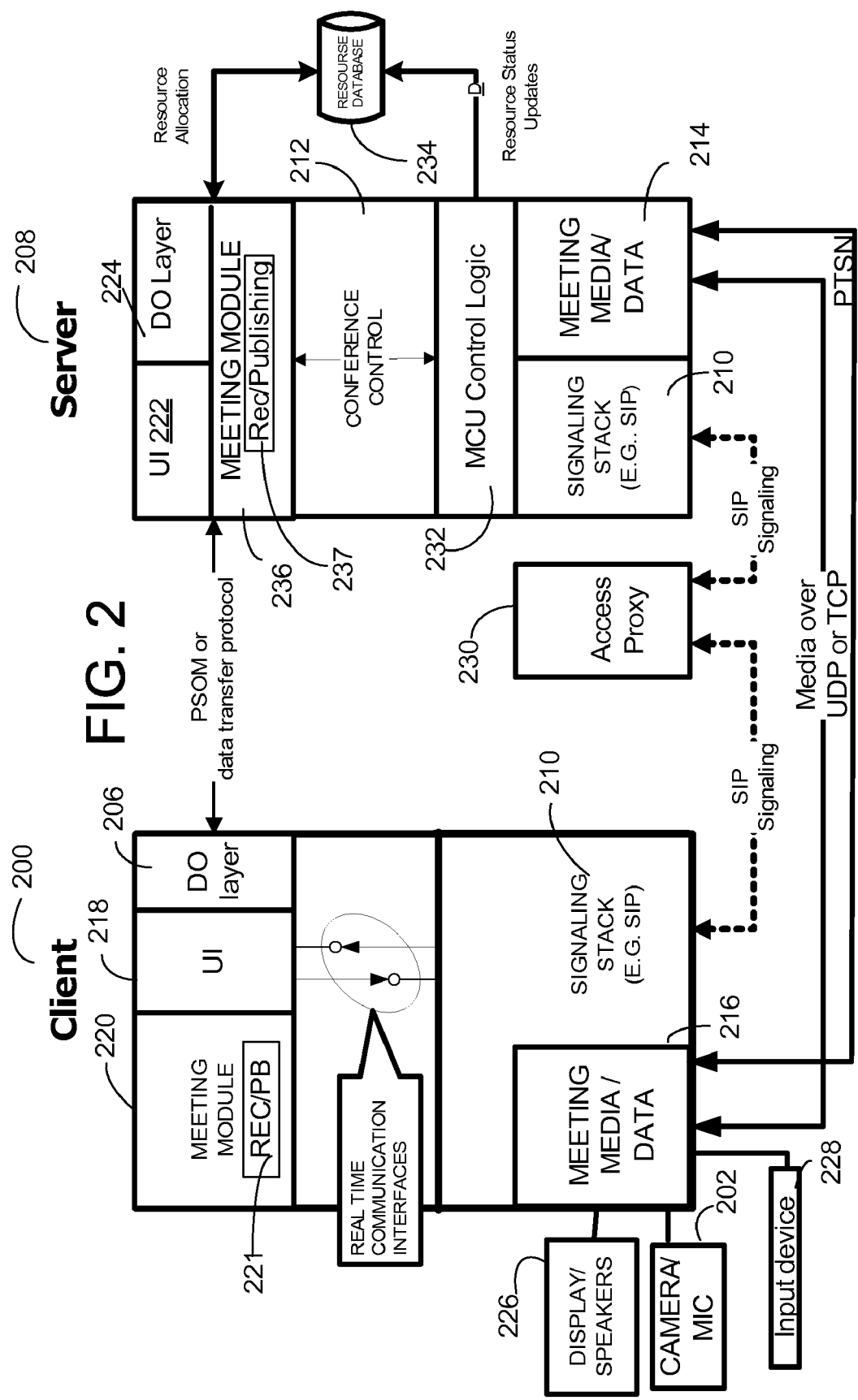
FIG. 2 is a diagram depicting a high level system architecture and environment employed in the present technique.
Figure 3:
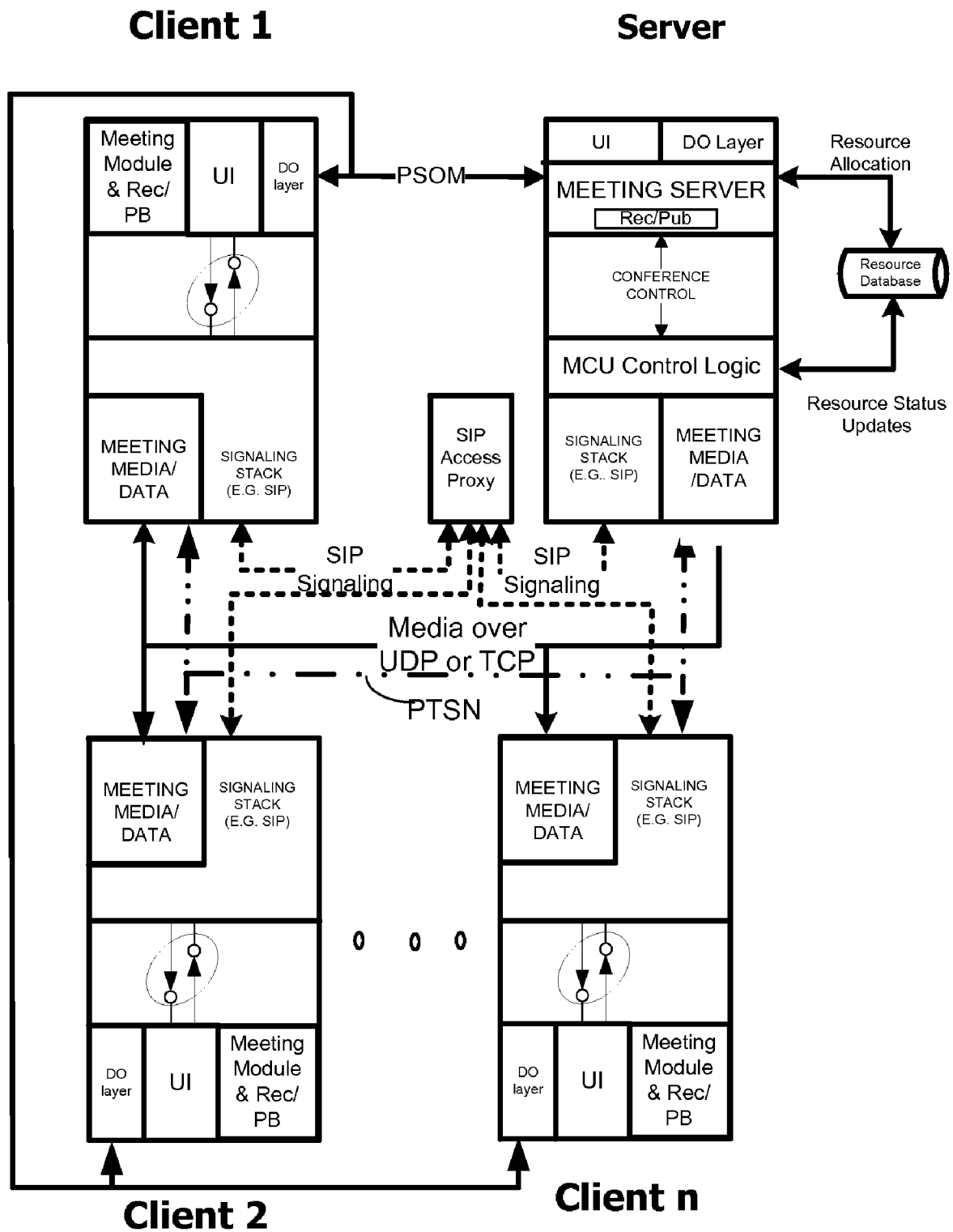
FIG. 3 is a diagram depicting a high level system architecture and environment employed in the present technique wherein multiple clients are shown.

FIGS. 2 and 3 provide exemplary architectures wherein the present interactive recording and playback technique can be practiced. Various client and server components interact over a network, such as for example the Internet or an intranet, for the present interactive recording and playback technique. Additionally, these components can also be connected to a Public Switched Telephone Service (PTSN). It is noted that the client and server components can be any of the computer devices described in the computing environment.

2.2.1 One or more clients—The present interactive recording and playback technique includes one or more client(s) 200 that participate in a web meeting, conference or training session. These one or more clients 200 receive audio/visual (A/V) data from any local A/V source (e.g., camera and/or microphone 202) and can send this A/V data over a network 204. In one embodiment, there is a distributed object (DO) layer 206 which abstracts the signaling transactions 210 between the client 200 and a meeting server 208. Similarly, conference control 212 and media transactions 214, 216 between the client 200 and the server 208 may be abstracted, as will be known by those skilled in the art. The meeting module 220 for setting up and executing a meeting, which also includes a module for recording and playing back meeting data 221, as well as modules sending and receiving meeting data, video and audio, are built on top of these infrastructure pieces. The present interactive recording and playback technique also includes a User Interface (UI) layer 218 at the client 200 that allows set up, control and display of the system and data. The client can also process integrated audio such as Voice over Internet Protocol (VOIP) and Public System Telephone Network (PSTN).

The client 200 includes a meeting module 220 and receives audio/visual data from any audio/video source, such as a conventional web camera/microphone 202. The client renders the audio/video on a display with speakers 226 (or a display and separate speaker) and also has an input device 228 such as a keyboard or mouse. The client also has a module for receiving and storing various real-time communication (RTC) and meeting media and data 216 and a module 210 for communicating with a meeting server 208. In one embodiment, the meeting server communicates with the client typically via a SIP protocol via an Access Proxy 230 which interfaces with a signaling stack 210 at the meeting server 208. The Session Initiation Protocol (SIP) is an application-layer control (signaling) protocol for creating, modifying, and terminating sessions with one or more participants. These sessions typically include Internet telephone calls, multimedia distribution, and multimedia conferences. It is widely used as signaling protocol for Voice over IP, along with H.323 and others. Alternately the communication between the client and the meeting service server takes place via Persistent Shared Object Model (PSOM) protocol via a Data Object layer 206, although any other protocol for sharing data could be employed. The client's user interface (UI) control takes place via a UI control module 218. The clients and the server can also be connected to the PTSN 236. In one embodiment of the interactive recording and playback technique, the clients can capture and store data and share their stored data with other clients and/or the server.

2.2.2 A meeting server—The present interactive recording and playback technique includes a server 208 that hosts the meeting over a client-server network 204. The meeting server also includes a UI layer 222 for setting up the meeting and for receiving, sending, rendering video streams etc. and related notifications. The meeting server 208 also includes a DO module 224 for abstracting transactions between the client and the server, and includes at least one Media Control Unit (MCU) 232 which keeps track of incoming media data in a media stack 214, and also keeps track of other meeting data, and the status of the meeting participants via a control module 212 and a resource database 234 in order to control the meeting. The meeting server also includes a meeting module 236 which manages the meeting and employs a recording and playback module 237 for the recording and publishing of meeting data. The server can also capture and publish meeting data and distribute this data to one or more clients.

The above discussed configuration can be extended to many clients as shown in FIG. 3, which can operate as meeting attendees. It should be noted that many other client-server configurations could also be used to practice the present interactive recording and playback technique and the configurations shown in FIGS. 2 and 3 are just shown as examples.

2.3 Terminology

The following terminology is useful in explaining the present interactive recording and playback technique.

2.3.1 Client-Side Recording

Client-side recording is a recording model where data is captured and published on a client machine. It gives the end-user more control over his or her data, since no recordings data is preserved on the server. Due to the client centric nature of client-side recording, it is typically an individual experience. Each user's recording is separate and unique, and is a reflection of what that user saw in the meeting. Any changes to recording settings, therefore, are applicable only on that client and do not impact any other user.

2.3.2 Server-Side Recording

Server-side recording is a recording model where data is captured and published on the server, eliminating the need for higher system requirements on the client and know-how of the user. Due to the central nature of server-side recording, it is a typically a shared experience. It is the single canonical view of the meeting from the server's perspective. Hence, when one presenter changes the recording controls, all presenters will see the change. There is typically one server-side recording instance of a meeting at any given time.

2.3.3 PSTN Gateway

This component acts as a bridge between a Public Switched Network (PSTN) line (more commonly known as the normal phone line) and a Voice over Internet Protocol (VoIP) system. It allows for PSTN and VoIP hybrid meetings by connecting to a PSTN call and bringing the conversation to a VoIP meeting while carrying the VoIP conversation to the PSTN call.

3.0 Overview of the Interactive Recording and Playback System

Figure 4:
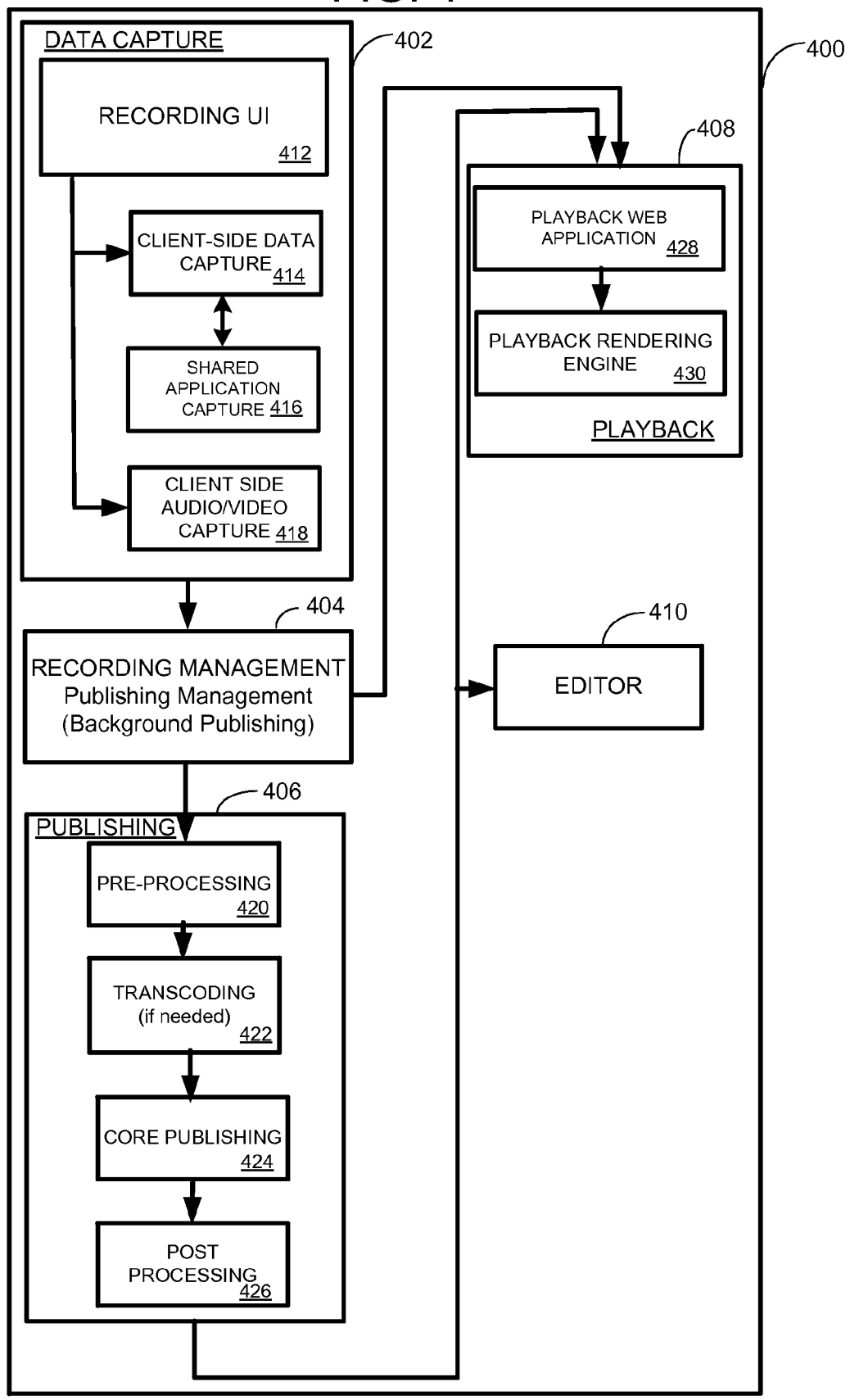
FIG. 4 is a system diagram depicting one embodiment of the present interactive recording and playback system.
Figure 5:
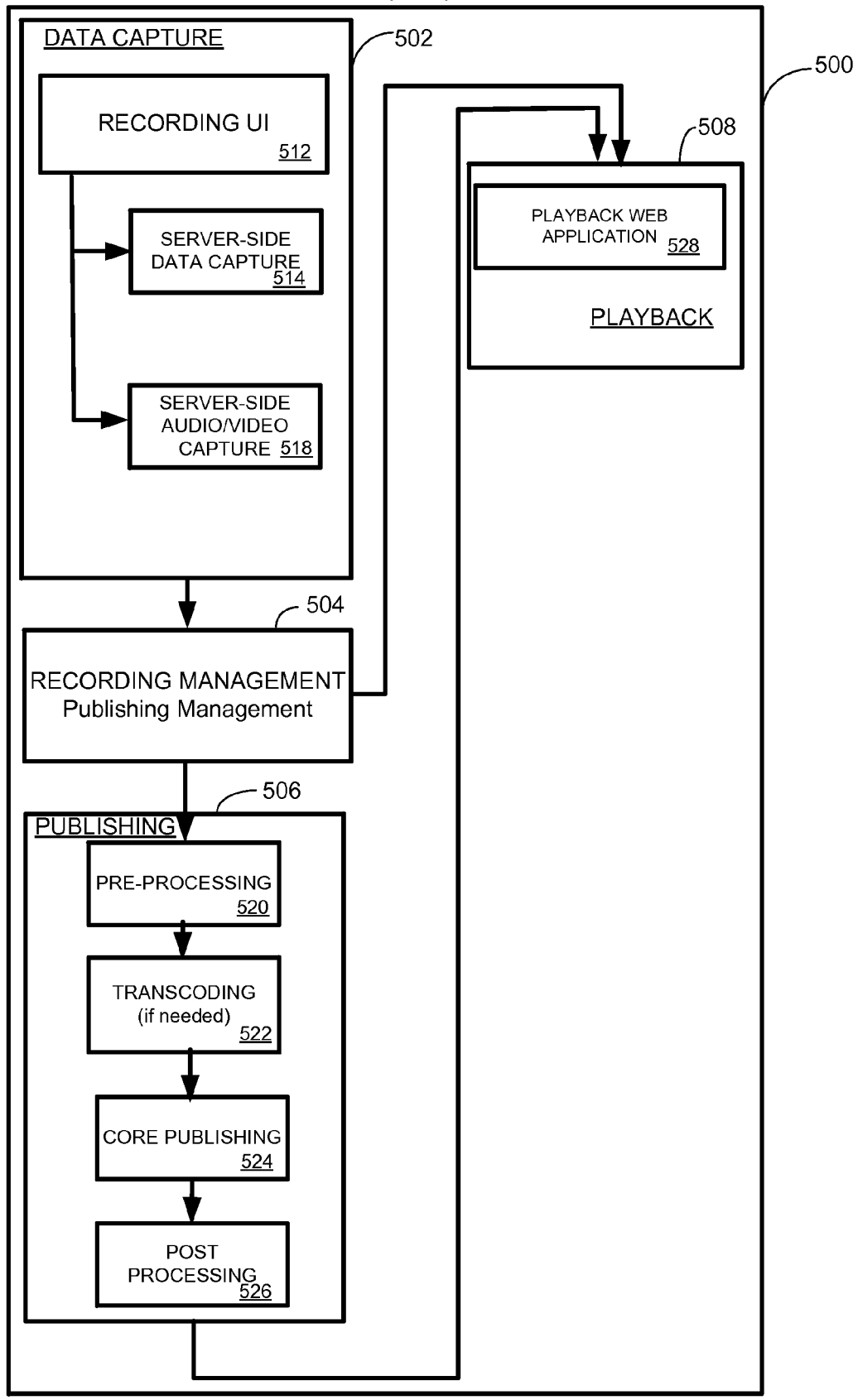
FIG. 5 is a system diagram depicting one embodiment of the present interactive recording and playback system.

An exemplary recording and playback module 400 of one embodiment of the interactive recording and playback system resident on a client is shown in FIG. 4. As can be seen in FIG. 4, this system module includes a module for capture 402, recordings management 404, publishing 406, playback 408 and an editor 410 for editing recorded files. A similar exemplary recording and playback module 500 of one embodiment of the interactive recording and playback system resident on a server is shown in FIG. 5. As can be seen in FIG. 5, this system module 500 includes a module for capture 502, recordings management 504, publishing 506, playback 508. Details of the exemplary recording and playback module 400 resident on the client and shown in FIG. 4 are provided in the paragraphs below. The capture 502, recordings management 504, publishing 506 and playback 508 modules of the server-side module 500 provide similar functionality as that provided by the capture 402, recordings management 404, publishing 406 and playback 408 modules of the client-side module 400, as will be known to those with ordinary skill in the art. The server-side playback module 508 typically does not render the recorded data, however.

3.1 Capture Module

The capture module 402 captures meeting data to include meeting content (e.g., presentations, images, spreadsheets, documents), generated data content (annotations, text slides, questions and answers (Q&A), shared notes and so on), audio and video from the meeting and meeting attendee information.

3.1.1 Context

Generally web-based meeting systems support two recording output formats: a screen capture or scraping format and per-audio slide format. The screen scraping format encodes all data and audio in the meeting to a single screen-scraped file for playback from a streaming server or a local directory. This is the most widely used format employed today. Basic per-slide audio format is a low fidelity format that converts the final view of most slide types into images.

Both of these formats have their own limitations. Fundamentally, the WMV format is not suited for representing the kind of content that is typically shared in a live web-based meeting. This content is character oriented and is better represented with text and meta-data. For example, one minute of text data captured requires less than 1 kb storage, whereas the same data represented in screen-scraped or image format requires more than 230 kb even with heavy compression. Even with the large size trade-off, the fidelity is not as good as the original text format—it cannot be scaled, resized or copied to clipboard. Even at higher data rates fidelity loss is inevitable. Additionally, there is dramatic overall content degradation and color banding. It has a fundamental inability to support multiple audio and video streams or multiple parallel tracks in a single file. Lastly, screen-scraping format requires long publishing times. All content needs to be rendered to an off-screen buffer and then encoded to a movie sequence, making the publishing process very time consuming.

The slide show formats, on the other hand, are very primitive formats. Due to their static image nature, these formats do not support Application Sharing, annotations, video, multimedia content and most dynamic content. These formats also do not maintain intermediate states, they only provide the final state of dynamic content.

3.1.2 Data Capture

The present data capture module 402 is responsible for capturing meeting proceedings. The capture module 402 includes a User Interface (UI) 412 which allows a user to set up the recording of data in multiple formats and from multiple sources. The data capture module can also employ a client-side data capture module 414 that handles client-side data capture to include coordinating with a shared application capture module 416. The data capture module 402 can also include a client-side audio video capture module 418 which captures audio and video at the client. On the other hand, all data can be captured on the server side. All of this data are recorded along a master timeline. The data, in conjunction with the master timeline, is used to produce multiple indices indexing recordings based on multiple criteria along the master timeline. The capture process also includes multi-track support wherein tracks in different formats are available for selection. Each track is independent from the other tracks and operates in parallel. That is, each of the data sources (e.g., the audio, video or meeting content in various formats for the meeting or any sub-meeting) is considered as a different track which can be separately replayed and edited. The capture module 402 is capable of capturing panoramic video if one of the inputs is an omni-directional camera and a microphone array.

Content will retain greatest fidelity in its most native state and web playback provides the greatest reach and audience coverage. Hence, as much as possible, the captured content captured by the interactive recording and playback system is kept in its native format or ported to an equivalent format that can be played back in a browser, with minimal loss in fidelity in the conversion process. A web browser is a software application that enables a user to display and interact with text, images, and other information typically located on a web page at a website on the World Wide Web or a local area network. Text and images on a web page can contain hyperlinks to other web pages at the same or different websites. Web browsers allow a user to quickly and easily access information provided on many web pages at many websites by traversing these links. Web browsers are the most commonly used type of Hypter Text Transfer Protocol (HTTP) user agent (a client application used with a particular net protocol). Although browsers are typically used to access the World Wide Web, they can also be used to access information provided by web servers in private networks or content in file systems. The universal format used by the interactive recording and playback technique is ubiquitous in that it is platform neutral (e.g., independent of the computer or operating system used).

3.2 Publishing

The publishing module 406 of the interactive recording and playback technique converts the captured data into a universal format that can be rendered readily by the playback module. One embodiment of the interactive recording and playback technique employs a high fidelity presentation (HFP) format publisher. The HFP publisher uses the HFP format, which is discussed in greater detail below. The publishing process (which includes a preprocessing module 420 that collects and merges data from the clients and server into a common timeline) automatically generates data in a format that an end user can use with only a browser and a media player (computer software for playing back multi-media files such as audio and video). The publishing module 406 also includes a transcoding module that converts certain captured data formats into different data formats suitable for publishing if necessary. The publishing process further includes a core publishing module 424 that publishes the data in a universal format and produces the multiple indices employed by the interactive recording and playback technique. It also is responsible for panoramic image production. Lastly, the publishing process includes a post-processing module 426 that is employed in post processing data to clean up temporary data files.

In the HFP format the following conventions apply in order to play the meeting data using only a web-browser and a media player, if the data captured is not already in a format that can be played with only a web-browser and a media player (or preferably a web-browser with an embedded media player):

Electronic slides with animations (e.g., in PPT format) are converted to web render-able format during publishing (e.g., using Dynamic Hypertext Markup Language (DHTML) or Vector Markup Language (VML)).

Microsoft Document Imaging (MDI) documents are converted to non-scaled scrollable graphics.

Any web slide that provides a link which opens a web page in a separate browser window.

Image slides are rendered at full fidelity without color banding.

Application Sharing is an element of remote access that enables two or more users to access a shared application or document from their respective computers simultaneously in real time. Generally, the shared application or document will be running on a host computer, and remote access to the shared content will be provided to other users by the host user. Files from application sharing are converted to WMV format and played back similar to a multi-media content file.

Annotations are provided in a scalable format.

Text slides are rendered on a client machine on playback and it is also possible for the client to copy text from the text slide.

Poll slides are rendered on a client machine using DHTML/VML.

MMC streams are played locally in a data frame. It is also possible to progressively download and play the MMC from a local source.

The final view of shared notes may be rendered in a Notes frame.

3.3 Playback Module

The interactive recording and playback technique provides a new web browser based replay experience. The playback module 408 can include a web playback application 428 for playing back data using a web-browser and a playback rendering engine 430 for rendering the data. In one embodiment, the playback functionality preferably employs the high-fidelity presentation (HFP) format for playback. The playback module 408 can include synchronized audio and video with proactive and adaptive degradation to accommodate lower bandwidth networks. The playback controls can include start, stop, pause, resume, fast forward and rewind. Additionally, the playback functionality can provide data indexing using final image thumbnails. The playback functionality further can include Resizable Playback with multiple preset views (turn on/off Speaker Video, Notes, Q&A etc.). Or the playback functionality can provide a single fixed view with automatic rearrangement for unavailable streams. The playback can also include active speaker indexing. For fast playback (greater than 1× the recording speed) the interactive recording and playback technique can correct for audio pitch.

3.4 Recordings Management Module

The recordings management module 404 coordinates the publishing process and can provide background publishing to a universal format that can be rendered with only a media player and a browser (e.g., in one embodiment, the previously discussed HFP format). The recordings management module includes the ability to track the status of the HFP publishing and the ability to download and playback HFP recordings. It also has the ability to invite users to view a playback and the ability to re-host downloaded recording on the meeting server.

3.5 Editor

The editor 410 provides post processing for error correction of the content or overall fit and finish. It also allows for the meeting content to be reformatted for other purposes. The editor typically includes a timeline editor that allows the order of data to be changed and a content editor that allows the content of the data to be changed. The editor provides the ability to cut the first x seconds or the last x seconds of a meeting recording or an individual slide. It has the ability to edit/replace all content for an individual slide including such items as annotations and Q&A. It also provides for speaker splitting and renaming, along with associated index metadata modifications. It also provides the ability to delete slides from the meeting recording or the ability to add slides, such as, for example, from a different meeting. The editor in terms of the content editor also provides multi-editor support. That is, for a file with multiple files within it, the editor used to create each of the multiple files edits its own data until the whole file has been converted to the desired format. More specifically, although the interactive recording and playback technique can employ the HFP format to allow data playback with only a web browser and a media player, it also supports editing of captured files using native editors (e.g., those used to create a given data file type). This may be done by retaining the captured files in their original format if it is necessary to convert them to a different format for rendering with a browser.

4.0 Overview of the Interactive Recording and Playback Process

Figure 6:
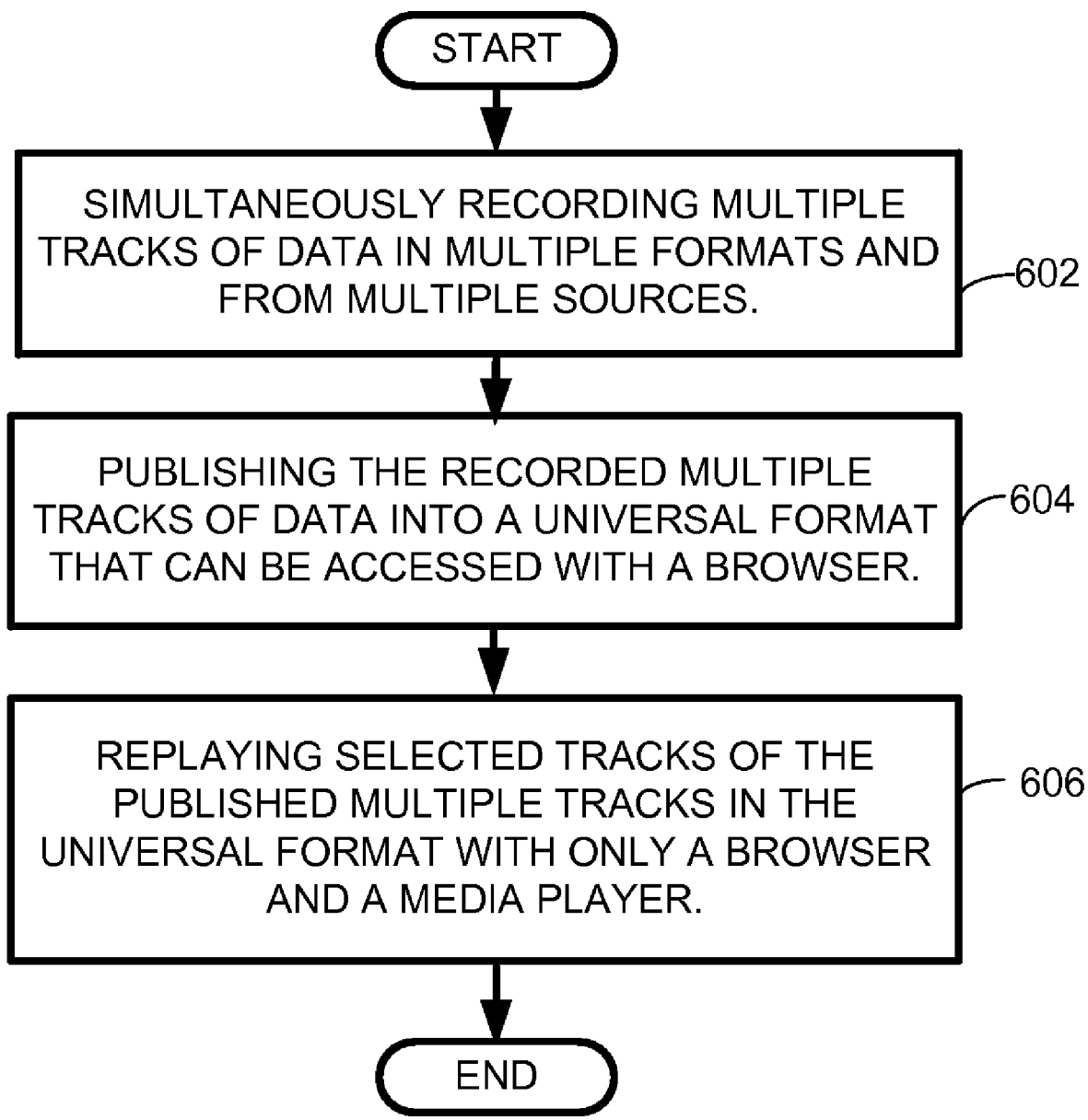
FIG. 6 is a flow diagram depicting one exemplary embodiment of the present interactive recording and playback process.

One exemplary recording and playback process of the interactive recording and playback technique is shown in FIG. 6. As shown in FIG. 6, process action 602, the process simultaneously records multiple tracks of data in multiple formats and from multiple sources. The recorded multiple tracks of data are then reformatted into a universal format that can be accessed with only a browser and a media player, as shown in process action 604. Selected tracks of the published multiple tracks in the universal format are then replayed with a browser and a media player (process action 606).

Figure 7:
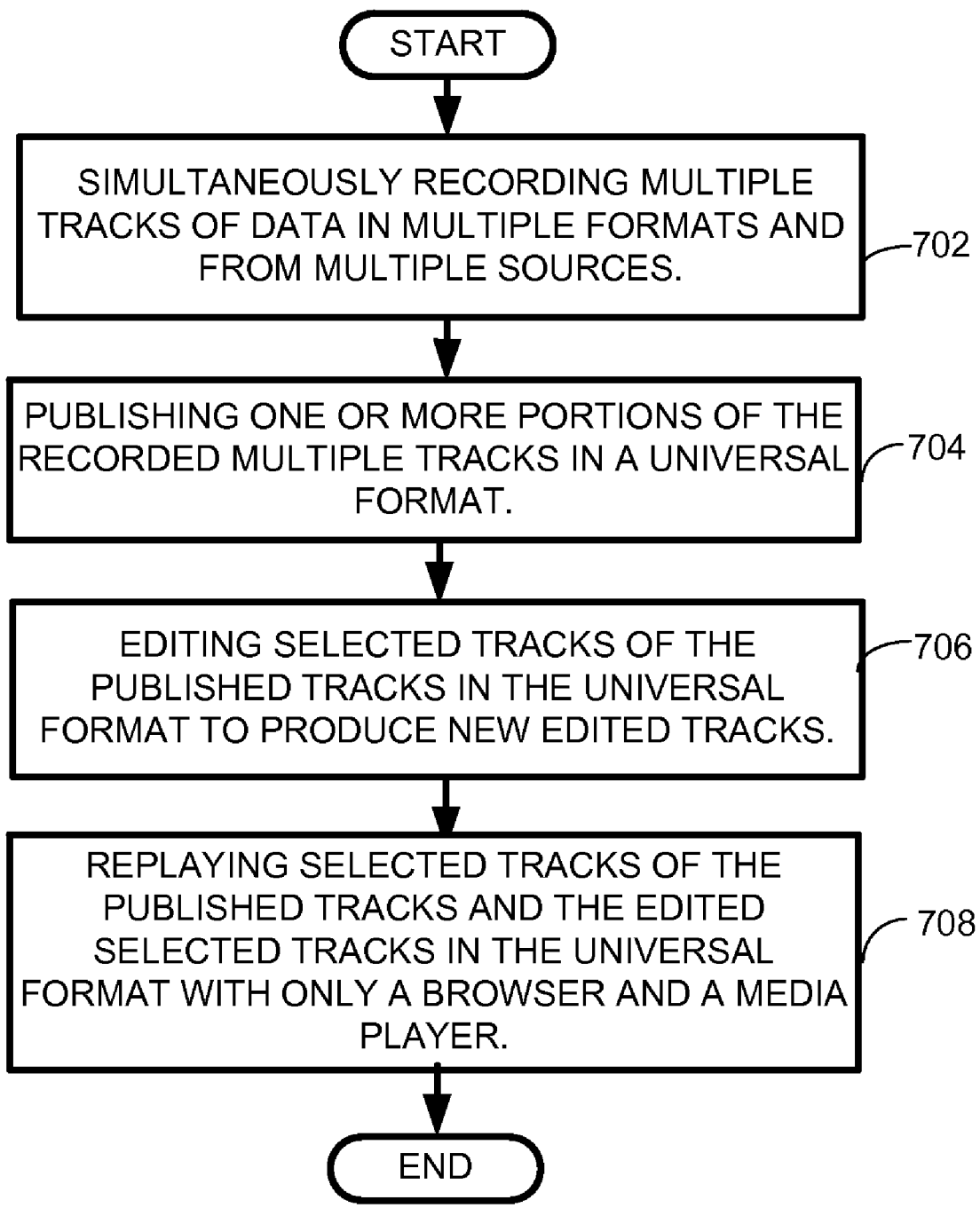
FIG. 7 is a flow diagram depicting another exemplary flow diagram of the present interactive recording and playback process.

In an alternate embodiment of the recording and playback process, shown in FIG. 7 recorded data is reworked to produce new material. As shown in FIG. 7, process action 702, the process simultaneously records multiple tracks of data in multiple formats and from multiple sources. The recorded multiple tracks of data are then reformatted into a universal format that can be accessed with only a browser and a media player, as shown in process action 704. Selected tracks of the published multiple tracks in the universal format are then edited to produce new edited tracks (process action 706). Selected tracks of the published multiple tracks in the universal format, either edited or unedited, are then replayed with a browser and a media player (process action 708).

An overview of the present interactive recording and playback system having been provided, the remaining portions of the description will be dedicated to providing additional details of the features discussed above and other capabilities.

5.0 Recording

This section focuses on the in-meeting recording experience for both server-side and client-side recording. One key difference to reiterate between server-side and client-side recording is that server-side recording is a shared experience. It is a single canonical view of the meeting from the server's perspective, stored and processed on the server. When one presenter changes the recording controls, all presenters will see the change. There is only one recording for the meeting. Client-side recording, on the other hand, is an individual experience. Each user's recording is separate and unique, and is a reflection of what that user saw in the meeting. The recording is stored and processed locally on the client's machine. Any changes to recording settings, therefore, are applicable only on that client and do not impact any other user. Table 1 delineates the differences between client-side and server-side recording in one embodiment of the interactive recording and playback technique.

TABLE 1

Client-side Versus Server-side Recording for One Embodiment of the Interactive Recording and Playback Technique

| Recording Phase | Server-Side Recording | Client-Side Recording |
|---|---|---|
| Capture | Captured on the Server. Yields a single recording per meeting with a canonical view perspective of the meeting. | Captured locally on the local Client. Yields an independent recording for each client from the perspective of the client. |

TABLE 1-continued

Client-side Versus Server-side Recording for One Embodiment of the Interactive Recording and Playback Technique

| Recording Phase | Server-Side Recording | Client-Side Recording |
|---|---|---|
| Publish | Published on the Server after the meeting by a backend (hosting environment) publisher process. | Published locally on the client machine. Publishing can be a CPU intensive process, this can be mitigated by Background Publishing. |
| Playback | Played back on the local client, with data coming from a web server, streaming server, UNC path or local disk. | |
| Recordings Management | Access, Management and Download functionality provided from the server. | Recordings are published to local drive. Minimal content management is required, especially with a Background Publisher. |
| Editor | The editing occurs on a client. | |

Unless otherwise noted, the following paragraphs apply to both server-side and client-side recording. Exceptions are explicitly noted.

5.1 Media Streams

All available streams are recorded (selected) by default, but the user can select or deselect any stream for recording. Any changes to these settings typically are not persisted beyond the current meeting. Pause and resume of recordings preserve these settings. In one embodiment, data cannot be turned off in a recording. The following media streams may be employed with the interactive recording and playback technique:

Audio: Audio represents the audio component of the meeting. Audio is considered a "first-class" citizen and hence, every effort is made to warn and encourage the user to establish an audio channel prior to the starting recording. In one embodiment of the interactive recording and playback technique, a Connect Audio sequence guides the PTSN audio channel establishment in server-side recording, while an Audio/Video tuning wizard guides the local microphone audio channel establishment in client-side recording. If an audio channel is not setup when recording is started, the audio will remain unselected and the recording will not contain an audio stream.

Video: Video represents the speaker video of the meeting. Video recorded will be as seen in the meeting. If video is not available for a particular person, no video will be recorded to the disk. Instead, the playback application may display a contact card providing the speaker's contact information.

Panorama: Panorama video is typically only applicable in client-side recording. Panorama is available if enabled and at least one presenter (or attendee if allowed to share video) in the meeting has an omni-directional camera with a microphone array or a similar device that can capture panoramic video. Stream selection should preferably be made prior to starting recording. Once recording is started, any change will typically require a stop and a re-start.

5.2 Connect Audio Sequence

In general, the audio connection and the PSTN Gateway (if needed) should be configured and fully functional by the time recording is initiated. This is a function of audio definition in the meeting and not a direct component of Recording. The Recording functionality of the interactive recording and playback technique will help to initiate recording if it is not established.

5.3 Pause

A pause command temporarily suspends the archiving of data. This can be used in a scenario where some side discussion or sensitive topic should not be recorded in the meeting. Recordings can be paused between sessions. For example, a weekly meeting can be recorded such that the recording is paused until the next week. This allows for multiple sessions to be combined into a single session.

5.5 Counter.

In one embodiment, a counter keeps track of the length of the recording. It is essentially an aggregation of how long this meeting has been recorded. The counter is incremented only in the Started state. It is not incremented in all other states, including Pause. In one embodiment, in server-side recording, if a presenter joins a meeting in progress, his counter will be updated to reflect the proper recording length. Only the initial value and major state change values of the counter are communicated from the server. All subsequent counter updates happen locally on the client machine to prevent unnecessary traffic related to counter updates. This leads to the possibility that different participants may see slight different counter values at the end of a long meeting due to clock skew and drift. This is acceptable since the counter is mostly for informative purposes.

5.6 State Change Messages

In one embodiment, a status messages will be generated for all major Recording state changes. These events include:

Start of Recording. Shown as soon as the first recording instance enters the Started state.

Recording Paused. Shown whenever the last (and at least one) recording instance enters the Paused state.

Recording Stopped. Shown after recording enters the Stopped state in all instances.

To prevent a flood of recording state change status messages, these events are generated based on the combined status of all recording instances in the meeting. For server-side recording, there is only a single canonical recording per meeting and these events correlate to that single instance. For client-side recording, however, it is possible for multiple participants (presenter and attendees, depending on meeting permissions) to be recording. Hence the started state is entered with the first participant commencing recording and exited with the last participant concluding recording. The Paused state is entered when no participants are in the started state and at least one participant is in paused state. These notifications are presented to all participants in the same manner as any other.

5.7 Error Messages

In one embodiment, any error message related to in-meeting capture will be communicated to all presenters in server-side recording and the local participants in client-side recording. This includes start errors from any of the MCUs (server-side), problems with PSTN Gateway (server-side), disk write errors (server-side and client-side), and any other problem that may impact the quality or completeness of the recording.

5.8 Out of Disk Space

Since data is written to the local disk in client-side recording, it is possible for the user to run out of disk space, especially if the meeting runs significantly longer than expected. When this happens, the recording automatically goes into a paused mode and informs the user that disk space has run out. The user may be able to clear up drive space and resume the recording.

5.9 Abnormal Termination of Console

When all clients unexpectedly leave the meeting the recording is paused automatically. It can be continued at a future point.

5.9 Security

Captured user data includes uploaded content, created data content (annotations, text slides, Q/A, shared notes etc.), audio and video from the meeting and attendee roster/information. In one embodiment, server-side recording captures this data on the server in mostly encrypted form and processes it (possibly on backend servers) to create playback data that is stored in a non-web accessible location. Client-side recording is on the user's hard drive and it is up to the user to protect the captured data.

6.0 Playback

The interactive recording and playback technique provides a web-based replay experience. The playback occurs using a user's browser and a media player (preferably one that is embedded in the browser). Playback includes fully synced audio, video and data streams. In one embodiment it also includes a Playback start page which has meeting static information, bandwidth detection and a browser setting check. The playback UI's basic layout is inside browser and includes four default frames and two optional frames: an active speaker video frame; a panoramic video frame; an indexing frame; content frame, notes and a Q&A Frame. The replayed meeting content includes slides (e.g., PPT) with and without animation (e.g. text slide, web slide), polls, whiteboards, snapshots, annotations, application sharing and multi-media content. The replay experience also includes meeting indexing which includes a meeting Content Index, a Speaker Index and a master timeline. The replay capabilities include Q & A, Shared notes, and Playback Control (e.g. Start/Stop/Pause/Resume). It also includes Mute Control, Speed Control with Audio Muted and Volume Adjustment.

6.1 Playback UI

In one embodiment of the interactive recording and playback technique, the playback experience starts from the point a user clicks the recorded meeting URL start.htm file. Once the user clicks the URL, a Playback start page will launch in the default browser on user's PC. The playback start page shows the meeting title, date, start time, end time, and meeting duration and a loading process with animation indicating the progress as well as a text message indicating the meeting file is loading. At the same time, the application also checks the bandwidth, the browser settings and prompts appropriate dialog box at the playback UI page.

6.2 Bandwidth Detection for Download

In the playback functionality, audio, speaker video and panoramic video streams are streaming loaded at replay time dynamically. The data file also consumes bandwidth to be downloaded at replay time. In one working embodiment the approximate bandwidth to download each stream is Audio: 15-24 kbps; Speaker Video: 80-250 kbps; Panoramic Video: 250-350 kbps and Data: 40-70 kbps. In one embodiment, the interactive recording and playback technique detects the bandwidth of the user's connection and prompts a suggestion dialog box to eliminate certain media streams from playback when the bandwidth is not enough to download available streams.

6.3 Web-Based Replay Experience

In the interactive recording and playback technique playback is a web-based application using the user's web browser and associated media player. The user is not required to install any application to replay the recorded meeting file.

6.4 Playback Fully Synced Audio/Video/Data Streams

The meeting replay ties all the audio, video and data streams together using the master timeline. This enables the playback experience to be automatically coordinated and displayed in relation to a timeline to allow the end user to move through the meeting as it happened during recording. In one working embodiment, the audio and video replay should preferably not be unsynchronized by more than 250 msec in normal replay with the required bandwidth no matter what the recorded meeting time. Here, normal replay means the audio and video is in play mode, not in buffering, pause, stop or fast speed mode. In one embodiment, if the user has a bandwidth that is marginally insufficient for replaying all available streams, the application will detect it and provide a warning message to the user. In this case the user can decide whether to attempt to replay all available streams or to terminate some of them. The interactive recording and playback technique may automatically eliminate certain media streams from playback if the user has significantly insufficient bandwidth for replaying all available streams. For example, a video stream playback may be closed when it is detected that the bandwidth does not support sufficient response times. In one embodiment, the interactive recording and playback technique will turn off panoramic video streams first, then speaker video streams, data streams and lastly audio.

6.5 Bandwidth Detection During Meeting Replay

At meeting replay time, the application will not directly detect a user's bandwidth. However, the application measures parameters of a user's replay experience to indirectly detect whether user has enough bandwidth to replay all available streams, and pops up warning message accordingly. In one embodiment during the meeting replay time, for every 1 minute, when a meeting recording is in buffering and normal replay mode (not in pause, stop, fast speed mode), starting from the point the meeting starts to replay, a checkpoint is set to detect if the buffering time is greater or equal to the normal replay time during the 1 minutes. If so, a warning message will be displayed to the user indicating that the bandwidth is not sufficient to replay all available streams of the meeting. If the buffering time is less than the normal replay time, no warning message will be displayed.

6.6 Playback UI Basic Layout Inside Browser

In one embodiment, the Playback UI's basic layout consists of four default frames, the Speaker Video frame, a Panoramic Video frame, an Indexing frame, and a Content frame. Besides these four frames, there are two optional frames, the Q&A frame and a shared notes frame that user can choose to open/close based on their needs.

6.7 Default Launch Experience for Layout

In one embodiment of the interactive recording and playback technique, as a default, in the browser, the Content frame and Indexing frame are shown. The embodiment scans the published meeting file to determine the available video streams and only shows the corresponding video frame(s) for it (them) from the time application is launched to the end even though the video stream may only be available for part of the whole meeting. The embodiment does not show the Q&A and shared notes frame by default. The Speaker video frame is not shown if there is no Speaker video stream in the whole meeting file. The panoramic video frame will not be shown if there is no panoramic video stream in the whole meeting file.

6.8 Replay of Meeting Content

All meeting contents shared and recorded are preferably replayed at the same meeting time and the same speed as in the real-time meeting. In one embodiment, content types include Slide(.PPT); Microsoft Office Document Imaging format (MODI) format; Text slide; Web slide; Poll; Whiteboard; Snapshot; Annotations; Shared Applications; MMC; and Test Slides. Details are provided in the sections below.

6.8.1 Slides.PPT

The application preferably plays the animation on a slide with the same display time and speed as happened in the meeting. If the user seeks to a specific time by global timeline or Speaker index that happens to be the middle of the animation (for example, the time is the middle of flying), the animation result up to that point will be shown. The application shows the slide with the result of animation if animation is not supported in the user's browser.

6.8.2 MODI File

In one embodiment, the interactive recording and playback technique replays any MODI file in PNG format. MODI is a document format used for any application document that can be sent to a printer. If the file cannot fit into the content area, a vertical and horizontal scroll bar is shown, which the user can scroll to see the whole page.

6.8.3 Text Slide

A text slide in the replay mode shows the pure text with the default font size that the browser supports. The default browser text size adjustment function is available to user. The application replays any changes/operations on the text slide at the same meeting time and with the same speed as it happens in the meeting. The User can copy the text out of text slide by using the browser's behaviors.

6.8.4 Web Slide

In one embodiment, a web slide in replay shows the URL the user entered in a 'new web slide' dialog at the meeting time. Even though the user navigates to several other web pages inside this web slide during the meeting, only one web slide is generated and replayed. The user is able to click on the URL and the web content shows inside the content frame. For any link error, the application takes the default browser behavior. If the user does not have the permission to open the web site, the application takes the default browser behavior with access denied info.

6.8.5 Poll

In poll replay, a replay of a previous poll question and results, the user cannot attend the poll or change the poll results at replay time. A poll slide shows the poll question, choices and any poll result changes in the meeting.

6.8.6 Image

In one embodiment, an image file is displayed at native resolution in the content area in replay mode and is not resized to fit the content area on the display.

6.8.7 Application Sharing

An application sharing data stream in replay mode is typically not resized to be replayed in the content area in client-side recording. In one embodiment, the application sharing replay replays a WMV file.

6.8.8 Multi-Media Content (MMC)-Audio/Video Files

MMC (multi-media as content) is meeting content that can be played while in a meeting. For example, meeting attendees can upload presentation slides so others can see them (and the presenter can control which slide is shown at any given time). MMC allows a presenter to upload a movie, video, or audio file using a media player. The presenter controls the play, stop, pause, fast forward/rewind functions. For recording, for example, a movie is recorded how the presenter played it (e.g., when they pressed play, fast forward, etc.) so that when it is played back the recording matches what meeting attendees saw in the meeting.

6.8.9 WMP

The interactive recording and playback technique typically replays any part of a Windows® Media Player (WMP) file at the same speed, time, and the control/operation as it was in the meeting. In one embodiment, the user does not have control over a WMP file in the replay mode. The only control the user has in replay mode is to pause/resume/seek/stop.

6.8.10 Flash

For synchronous viewing of flash files, the user is not able to control the flash file replay even for flash with interactive buttons. For frame-based flash, the application replays the flash file with the same speed, same control as it happened in the meeting. For time-based flash, the application replays the flash file from start to stop as it is. For viewing asynchronous flash, the application loads the native flash file. The user is able to navigate and control the flash before the next shared content starts to replay. For files that are frame-based, all commands are available including start/stop/pause/resume. For files that are time-based, only play and stop are available.

6.8.11 Whiteboard

Whiteboard files are drawn by meeting attendees while in the meeting, typically on a blank slide. Each annotation (e.g. each line, circle, etc.) that they draw is captured by the recording system. The recording will play annotations in the same way as they were drawn. In other words, when one views the recording one will see a whiteboard being drawn as it was drawn in the meeting. This annotation data is saved with timing data and after the meeting when the recording is published it is converted to VML (Virtual Markup Language) so that it can be rendered in a browser. Annotations can be put by themselves on a whiteboard, or they can be placed on top of the other slide types.

6.8.12 Annotation

As discussed in the paragraph above, the application replays the process of every annotation added on a whiteboard, slide, MODI, and snapshot file at the same meeting time as it happened in the meeting.

6.9 Meeting Indexing

The playback process of the interactive recording and playback technique provides the functions of 'Indexing by Meeting content' and 'Indexing by Speaker'. In one exemplary embodiment, by default, when the application is first launched, the meeting is indexed by meeting content.

5.9.1 Meeting Content Index by Thumbnail

In the meeting content index, in one embodiment, meeting content is shown as thumbnails in an indexing area on the display. In one embodiment, the thumbnails are organized by the meeting time and displayed vertically from top to bottom with ascending time in the area. The text for the thumbnail name is aligned with the thumbnail image. Each thumbnail occupies the same space and displays evenly. Navigation using the meeting content index is through scroll bars and keyboard arrow keys. When the meeting replay time reaches to the thumbnail time, the thumbnail will be solid filled with a prescribed color till the next thumbnail time is reached. In one embodiment, single or double clicking on a thumbnail will make the replay seek and start from the thumbnail time. The content pane shows the associated content.

If a slide or other page is loaded in the meeting, but not shared, it will not be a thumbnail. If the slide or other page is shared several times along meeting timeline, the thumbnail includes several copies of the slide with different meeting times. In one embodiment every slide shared in the meeting is included as a thumbnail along the meeting timeline. Every page of MODI file shared in the meeting along the meeting timeline will also included as a thumbnail. For web slides, only one slide is generated even though the presenter navigates to several web pages inside it. Images, text slides and polls are included as a thumbnail. For a shared application, one thumbnail for one application is included no matter how long the application is shared and what operation is made within the application. For MMC, one thumbnail for one MMC shared is included as a thumbnail. For whiteboard data, one thumbnail for each whiteboard is included as a thumbnail.

The thumbnail shows the 'final state' of the meeting content with few exceptions. These exceptions are: the final state of a slide with annotation is shown if annotation is added. The final state of a MODI file with annotation is shown if annotation is added. One line of a URL for the web slide is shown even if the URL is longer than one line. The final state of the image with annotation is shown if annotation is added. The final state of a text slide, poll and whiteboard are shown. For a shared application, the thumbnail shows an image representing the shared application.

6.9.2 Speaker Index

The speaker index provides speaker filtering and speaker indexing functionality which is based on speaker switching. The speaker information is listed and sorted in the master timeline. The user who spoke first is displayed on the display first and then the rest of the speakers are listed in ascending order in times for which they spoke. In one embodiment next to the speaker name is a speaker filter checkbox and a speaker subsection tree structure icon. The user can choose to select and deselect the speaker by checking and unchecking the check box. All subsections of the speaker are organized in tree structure, by the start to end time that they spoke during the meeting. Also next to the speaker name is the sum of the subsections listed in the tree structure (the times they speak during the meeting) and the overall time duration that they spoke as a reference for the end user (e.g., the total time that this speaker spoke during the duration of the recorded meeting). The user has options to select/clear individual or multiple speakers based on their needs. At any time, at least one speaker must be selected. That is to say, a user cannot deselect all of the speakers. The meeting replay is along the meeting timeline with the selected speaker section only. If the speaker is not selected, his/her section in the meeting will not replay. If the user filters the speaker during meeting replay, the meeting replay jumps to the closest subsection of the selected speaker along the meeting timeline

6.9.3 Speaker Filter

In one embodiment, the set of individually selected speakers is not a savable option and will not be retained once the user closes the browser. The default state is "All Speakers Selected" when user switches to the speaker index. At least one speaker must be selected at any point of time. At a time when only one speaker is selected, a user cannot deselect this speaker. When a speaker is selected, only the audio, video and data associated with selected speaker section will be replayed along the meeting timeline. The audio, video and data associated with any deselected speaker will not be replayed.

6.9.4 Speaker Tree View Index

A user can expand the tree view to see the index of all the sub sections a speaker talks during the meeting by clicking the speaker name or by clicking the icon. In this view, each time that a speaker spoke during the meeting is listed by the start to end time that they spoke during the meeting (e.g., in an hh:mm:ss-hh:mm:ss format). A single or double click on the speaker will expand the tree view. The user can click any sub-section and the replay will start from the beginning of the subsection. Once the application finishes the replay of the sub-section, it will find the next sub section that is associated with a selected speaker and closest to the current sub-section along the meeting timeline, and replay from that point. The process will continue till the meeting ends or the user clicks another section index whichever happens first

6.9.5 Switching from Content Index to Speaker Index

By default, in one embodiment, when the interactive recording and playback technique switches to the speaker index the first time in the session, all the speakers are selected and a checkbox next to each speaker is checked. All the speaker indices are listed. The replay is along the meeting timeline. The user selects certain speaker sections through the speaker filter. The meeting replay jumps to the closest subsection of the selected speaker along the meeting timeline and continues.

6.9.6 Switching from Speaker Index to Content Index

When the interactive recording and playback technique switches from speaker index to content index the set of individually selected speakers will be retained during the switch. When a user clicks to the thumbnail index that is associated with the selected speaker section, the meeting starts to replay from the beginning of that speaker section. This starting point can fall at any time within the thumbnail depending on at what time this specific speaker starts to speak. When the user chooses the thumbnail index that is not associated with any selected speaker section, the application jumps to the closest next thumbnail that is associated with selected speaker section along timeline. If no next thumbnail exists, the interactive recording and playback technique ignores the user's selection and the meeting continues to replay.

6.10 Q & A

The interactive recording and playback system preferably shows the answered public questions and associated answers in the meeting. In one embodiment this is displayed in a Q&A pane on the display. If the question is never answered or private, both the question and answer are not shown. In one embodiment, the Q & A pane only shows the answered time, no question time is available. The user cannot add/remove/edit in the Q & A pane.

6.11 Shared Notes

In one embodiment, if there are shared notes in the meeting, shared notes are shown only once on replay, right before the meeting finishes. The user cannot add/remove/edit in the shared notes pane.

6.12 Playback Control

In one embodiment of the interactive playback and recording technique, playback control consists of start, stop, pause, resume, skip to next or previous index, mute control, volume adjustment and speed control.

6.12.1 Start Playback

After the user successfully loads the published meeting files, the interactive recording and playback technique automatically launches and displays the playback controls as discussed below.

6.12.2 Base Start/Stop Buttons Functionality

In one embodiment of the interactive recording and playback technique if it is the first time the user replays the meeting file, the file starts to replay at 0:00:00 (e.g., the far left of master timeline). If the user has replayed the meeting and exited by closing the web browser, and this meeting file is within the 5 most recent meeting files that user replays, the replay starts from the point the user exited previously. If the user has replayed the meeting and this meeting file is beyond the 5 most recent meeting files that user replays, the replay starts from 00:00:00, the far left of master timeline.

When the user activates the play button, playback starts and will continue to play back all streams available during recording until the end of the file is reached or user clicks stop/pause button or close the browser. The panorama and speaker video frames show video. The meeting audio can be heard and data will progress as was recorded.

At any point during playback process, the user can stop the playback. When 'Stop' is selected, the playback is returned to the beginning of the meeting file. The panorama and speaker frames show first frame of video if recorded and no audio can be heard.

6.12.3 Pause/Resume

The user can 'Pause' playback when the playback has been started and after the user has selected the 'Play' command. In this case the replay of the recording will pause until play is selected again.

6.12.4 Skip to Next/Previous Index

During playback, the user has the option to skip to next/previous speaker or meeting content depending on the index option the user chooses. If the user chooses meeting content in the index options, then the skip to next/previous button should skip to next/previous meeting content.

6.12.5 Mute Control/Volume Adjustment

The interactive recording and playback technique provides "Mute and "UnMute" audio control. For the mute choice playback through the published file continues and video and data continue to be viewed during playback as previously, but now are not accompanied by sound output. For the unmute action, playback through the published file continues and video and data continue to be viewed during playback as previously, but now is accompanied by sound output.

6.12.6 Speed Control/Fast Playback

In one embodiment, the interactive recording and playback technique supports playback speed control or fast playback with a default speed of 1.0×, which is the speed at which recording took place. In one working embodiment of the present interactive recording and playback technique, speeds of 0.5× to 2.5× are supported with a granularity of 0.5. The audio is typically pitch corrected at speeds greater than or less than 1.0×. During fast reply time, audio, video, indices and content are replayed with the speed the user chooses, either normal or fast.

6.12.7 Master Timeline

The master timeline is displayed in the browser window during replay. In one embodiment, during the playback of the meeting the scroll bar moves across the timeline (from start at left to the far right) to indicate the progression of time through the recorded meeting file. The scroll bar progresses to the right according to the relative scale of the global timeline as the meeting playback progresses. In other words, the relative amount of scroll is related to the overall meeting duration. If the meeting was 10 minutes long then each of ten minutes should be divided across the total number of pixels that the master timeline occupies. The scroll bar also has a mouse over functionality that will display the exact time during the meeting if hovered over. The seek function in the master timeline functionality allows the end user to "search" or scan through the published meeting file's contents via directly interacting with the master timeline. While scanning through the file is made possible through faster playback and other various functionality additions this is the most direct.

5.13 Interaction with Browser Control

During meeting replay, besides playback control the interactive recording and playback technique provides, the user can also click back, forward, stop, and refresh button in the browser. In one embodiment, for all other user actions through browser control, the interactive recording and playback technique takes default browser behavior as it is.

It should also be noted that any or all of the aforementioned embodiments throughout the description may be used in any combination desired to form additional hybrid embodiments.

Wherefore, what is claimed is:

1. A computer-implemented process for recording a multimedia event and reformatting the captured data into a universal format for playback, comprising the process actions of: using a computing device for, simultaneously recording multiple data tracks in multiple formats and from multiple sources, wherein each data track is independent from the other data tracks and operates in parallel; and publishing the captured multiple data tracks in multiple formats from multiple data in a universal format that is platform neutral and wherein the data in the universal format is accessible using only a web browser and a media player embedded in the web browser; and wherein publishing in a universal format further comprises: converting electronic slides with animation into a web-renderable format; converting any imaging document into non-scaled scrollable graphics; rendering image slides at full fidelity without color banding; converting files used in application sharing to WMV format; converting annotations to slides into a scalable device independent rendering instructions; and converting poll slides into a DHTML and VML format.

2. The computer-implemented process of claim 1 wherein the published tracks are indexed using multiple indices and a master timeline.

3. The computer-implemented process of claim 1 further comprising replaying portions of the selected tracks of the published multiple data tracks in the universal format.

4. The computer-implemented process of claim 1 wherein at least some of the captured multiple data tracks are image or video data captured with a panoramic camera and wherein the image data is published as a panoramic image.

5. The computer-implemented process of claim 1 wherein one or more tracks of the published multiple data tracks in the universal format are fully editable.

6. The computer-implemented process of claim 2 wherein one or more of the published tracks can be selected for replay using one or more of the multiple indices.

7. The computer-implemented process of claim 2 wherein the multiple indices comprise a meeting content index that indexes when content presented in the web conference changes and a speaker index that indexes when a speaker in the web conference changes.

8. A computer-implemented process for playing back tracks of data in multiple formats and simultaneously captured from multiple sources and converted into a universal format comprising the process actions of: selecting tracks of data simultaneously captured from multiple sources and in multiple formats and converted into a platform neutral universal format, wherein each data track is independent from the other data tracks and operates in parallel; and wherein converting into a platform neutral universal format further comprises: converting electronic slides with animation into a web-renderable format; converting any imaging document into non-scaled scrollable graphics; rendering image slides at full fidelity without color banding; converting files used in application sharing to WMV format; converting annotations to slides into a scalable device independent rendering instructions; and converting poll slides into a DHTML and VML format; and playing each of the selected tracks in a synchronized manner using a web browser and a media player that is embeddable in the web browser.

9. The computer-implemented process of claim 8 wherein perceived playback quality of the played selected tracks is dynamically detected and adjusted to provide improved playback quality by playing only portions of the selected tracks.

10. The computer-implemented process of claim 8 wherein playback quality is automatically adjusted by selecting which of the selected tracks can be replayed given an available amount of processing bandwidth.

11. The computer-implemented process of claim 8 wherein the selected tracks are stored on a server and wherein the selected tracks are played on a client in a synchronized manner.

12. The computer-implemented process of claim 8 wherein the selected tracks are stored on one or more clients and wherein the selected tracks are played on a client in a synchronized manner.

13. The computer-implemented process of claim 8 wherein portions of the selected tracks can be edited by a timeline editor that can edit the order of the selected tracks and content editors that can edit the content of the selected tracks.

14. A system for capturing data from multiple sources in multiple formats for a web conference and replaying portions of the captured data in a universal format comprising: a computing device comprising of: a capture module for capturing data in the form of audio, video and meeting content presented in the web-conference in its most native format; a recording management module that coordinates publishing of the data in the native format to a platform neutral universal format that allows the data in the platform neutral universal format to be accessible using only a web browser and a media player embedded in the web browser; a publishing module for converting the captured data in a universal format into a format that can be played back using a web browser; and a playback module that comprises a web browser; and wherein the publishing module automatically generates the captured data in a universal format, comprising converting electronic slides with animation into a web-renderable format; converting any imaging document into non-scaled scrollable graphics; rendering image slides at full fidelity without color banding; converting files used in application sharing to WMV format; converting annotations to slides into a scalable device independent rendering instructions; and converting poll slides into a DHTML and VML format.

15. The system of claim 14 further comprising an editing module for editing the data in the universal format.

16. The system of claim 14 wherein the capture module further comprises: a user interface for allowing a user to prescribe the parameters for the capture of the data; a meeting content capture module for capturing meeting content at a client and a server on a network; and an audio-video capture module for capturing audio and video at a client and on a server on a network.

17. The system of claim 14 wherein the publishing module further comprises: a preprocessing module that automatically merges and synchronizes the captured data to a common timeline; a core publishing module that publishes the data in a universal format and produces multiple indexes to access the published data using the common timeline.

18. The system of claim 14 wherein the publishing module publishes the data in the background in a manner so as not to interfere with a user performing other operations using the user interface.

* * * * *

UNITED STATES PATENT AND TRADEMARK OFFICE
CERTIFICATE OF CORRECTION

| | | |
|---|---|---|
| PATENT NO. | : 7,653,705 B2 | Page 1 of 1 |
| APPLICATION NO. | : 11/609673 | |
| DATED | : January 26, 2010 | |
| INVENTOR(S) | : Ananta Gudipaty et al. | |

It is certified that error appears in the above-identified patent and that said Letters Patent is hereby corrected as shown below:

In column 20, line 10, in Claim 1, after "that" insert -- it --.

Signed and Sealed this
Eighth Day of February, 2011

David J. Kappos
*Director of the United States Patent and Trademark Office*